United States Patent [19]

Galloway

[11] 4,415,847
[45] Nov. 15, 1983

[54] METHOD AND APPARATUS FOR SUPPLYING COOLING LIQUID TO A STORAGE BATTERY

[75] Inventor: James H. Galloway, New Baltimore, Mich.

[73] Assignee: Energy Development Associates, Inc., Madison Heights, Mich.

[21] Appl. No.: 291,029

[22] Filed: Aug. 7, 1981

[51] Int. Cl.³ .............................................. H02J 7/00
[52] U.S. Cl. ......................................... 320/2; 62/185; 62/201; 165/32
[58] Field of Search ............... 320/2, 35, 36; 363/141; 165/35; 62/185, 201

[56] References Cited

U.S. PATENT DOCUMENTS

| | | | |
|---|---|---|---|
| 3,062,999 | 11/1962 | Brown | 320/35 |
| 3,935,024 | 1/1976 | Symons | 136/6 E |
| 4,080,221 | 3/1978 | Manelas | 320/2 |
| 4,117,387 | 9/1978 | Windisch et al. | 320/35 |

Primary Examiner—William M. Shoop
Assistant Examiner—Anita M. Ault
Attorney, Agent, or Firm—Body, Vickers & Daniels

[57] ABSTRACT

A method and apparatus for providing a cooling liquid to the heat exchanger in a storage battery mounted on a vehicle for driving the vehicle, wherein the liquid is to be supplied to the battery at an inlet temperature which varies in a time-based relationship. The liquid to be cooled is obtained from the battery itself in a recirculative system located generally outside the vehicle. In accordance with this method and apparatus, the liquid returned from the vehicle mounted storage battery is divided into first and second portions, the first of these portions is cooled at a preselected cooling rate, thereafter, the cooled first portion and the uncooled or bypassed second portion are recombined to provide the liquid supplied to the battery heat exchanger. The ratio of the first and second portions is adjusted in accordance with a time-based relationship wherein the temperature within the battery is intentionally changed during a charging cycle.

39 Claims, 19 Drawing Figures

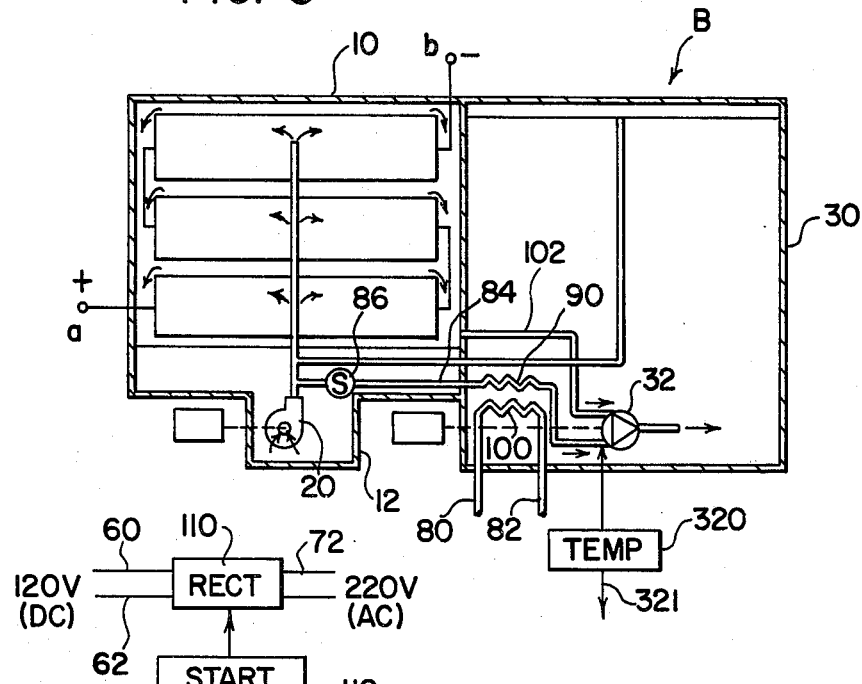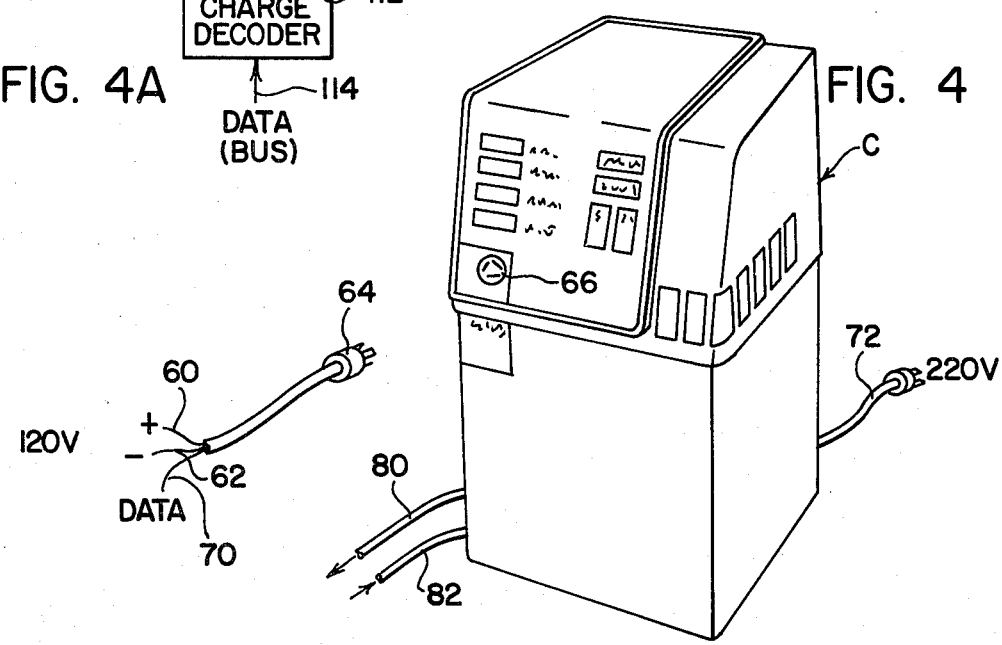

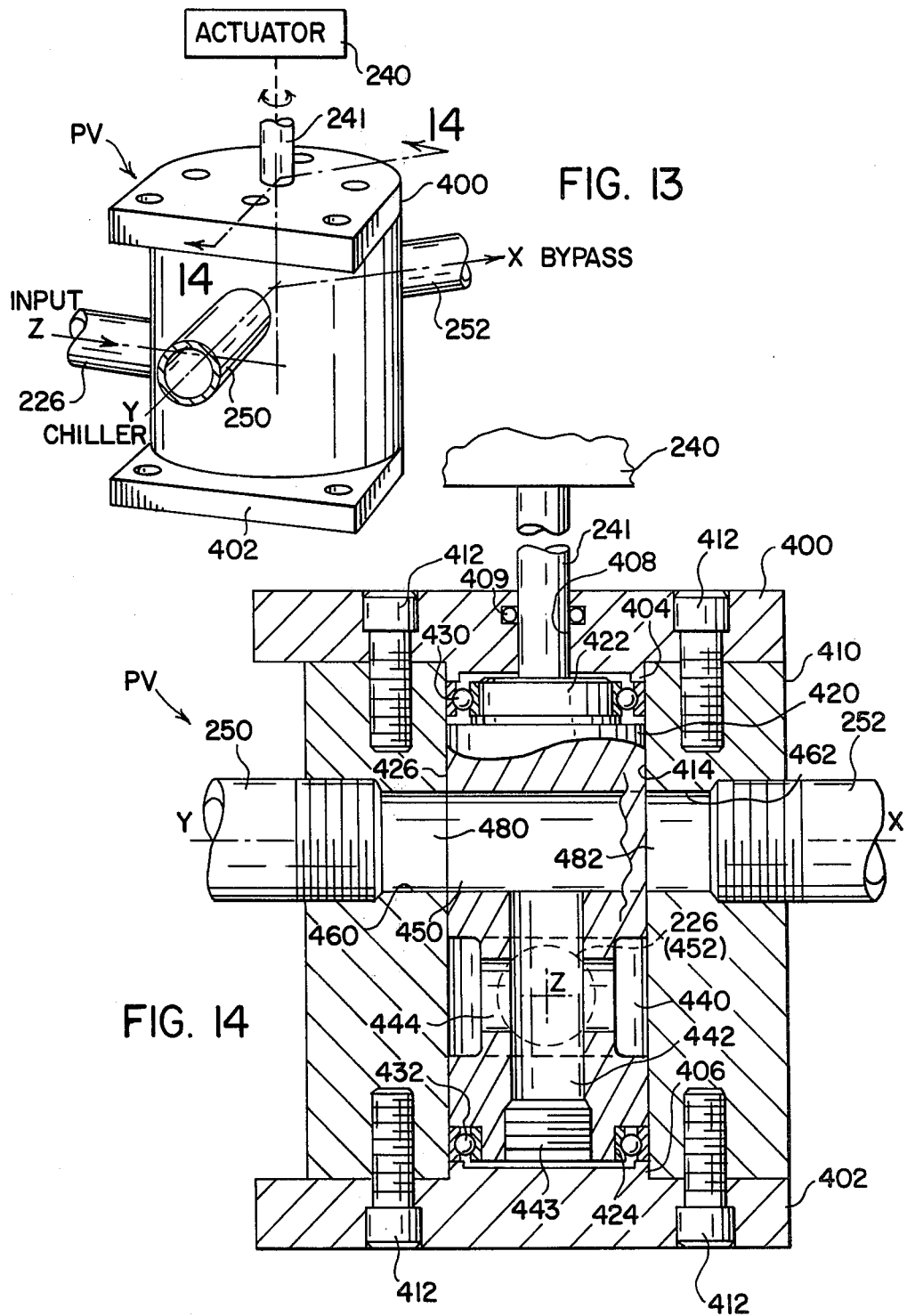

b = .461
c = 7/16
e = .046

METHOD AND APPARATUS FOR SUPPLYING COOLING LIQUID TO A STORAGE BATTERY

The present invention relates to the art of electric powered motor vehicles and more particularly to a method and apparatus for supplying coolant liquid to the main storage battery of an electric driven vehicle. As will be apparent, the present invention is generally applicable for use with a zinc-chloride battery system such as disclosed in prior U.S. Pat. No. 3,935,024; however, it has broader applications and may be used with motor vehicles driven by various batteries having characteristics of the zinc-chloride battery, such as liquid cooling requirements during the charging cycle.

BACKGROUND OF INVENTION

In recent years there has been a tremendous worldwide effort to develop motor vehicles operated by a fuel other than a petroleum distillate. Such efforts have resulted in hydrogen powered vehicles, steam powered vehicles and electric powered vehicles, the latter of which has been adopted as the most promising alternative to the normal gasoline consuming internal combustion engine. With the adoption of the electric motor vehicle, as the proposed answer to such a crucial problem, there has been a need to develop an on-board source of electrical power. Since fuel cells, nuclear generators and other systems have not been perfected to a degree which allows their immediate use on motor vehicles, most developmental efforts in commercializing electric powered motor vehicles now involve the use of a storage battery carried by the vehicle. For that reason, various types of storage batteries have been developed with the objective of increasing the range between charging, without sacrificing operating speed and/or decreasing the time and effort required in actually charging the on-board storage battery. These objectives have now been generally satisfied by a zinc-chloride battery of the type commercialized by Energy Development Associates and disclosed generally in U.S. Pat. No. 3,935,024. This patent is incorporated by reference herein as background information regarding the power supply or main storage battery to which the present invention is particularly applicable.

When employing a zinc-chloride battery, it is desirable to cool an area of the battery during the charging cycle to facilitate the formation of chlorine hydrate. The optimum temperature to which this battery area should be cooled varies as the charged state of the battery increases. Thus, it is necessary to monitor the cooling of the controlled areas of the zinc-chloride battery to optimize the parameters of the charging cycle. This is done to control battery pressures, which pressures are responsive to changes in heat within the controlled area of the zone-chloride battery. This monitored and controlled battery area is generally the area at which a minor amount of electrolyte is pumped or bypassed from the basic battery chamber or stack to the chlorine-hydrate storage area. There is a substantial need for a method and apparatus to control the cooling in this area of the battery, which cooling method can be accurately controlled to optimize the battery charging cycle.

PRESENT INVENTION

The present invention relates to a method and apparatus for controlling the heat within a specific area of a storage battery. The invention will be described with particular reference to controlling the electrolyte bleeding or bypass area between the stack and store of the zinc-chloride battery; however, it is appreciated that the invention has substantially broader applications and can be used for controlling the temperature in various areas of a storage battery when the battery is connected to an external coolant source, i.e. when the battery of the motor vehicle is being charged.

In accordance with the present invention there is provided an apparatus that provides a cooling liquid to the cooling heat exchanger at a given area of a storage battery mounted on an electric powered vehicle, wherein liquid at an inlet temperature, having a time-based relationship, is obtained from processing liquid exhausted by the battery heat exchanger. The term "time-based relationship" indicates that the inlet temperature to the battery heat exchanger can vary slightly as the charging cycle of the storage battery progresses. In this manner, optimization of the charging function can be obtained, especially when a zinc-chloride type of battery is being charged. The invention includes means for dividing the liquid obtained from the battery heat exchanger into first and second portions, means for cooling the first portion at a preselected cooling rate, means for recombining the cooled first portion and the second portion of the liquid to create a cooled liquid that is directed to the battery heat exchanger and means for adjusting the ratio of the first and second portions in accordance with the time-based relationship. By using this apparatus, the liquid cooling operation can be performed at a constant or fixed rate which rate, in practice, is the maximum cooling rate of an external refrigerating device mounted in a charging unit. The unit also supplies the electric power during the charging cycle. By changing the ratio of the cooled first portion of liquid to the uncooled or bypassed second portion of liquid, the inlet temperature of the coolant directed from the charging unit to the battery heat exchanger mounted in the storage battery ittself can be accurately controlled. There is no need to monitor and control the temperature of the refrigeration system in the charging unit. Also, in accordance with another aspect of the invention, the flow rate of the recombined liquid remains generally constant, irrespective of the portion of the liquid passing through the cooling or refrigeration device. The internal pump used in circulating the coolant can operate at a known, fixed rate and the refrigeration system can be operated in accordance with a fixed constant condition. These factors stabilize the operating parameters of the apparatus supplying coolant liquid while allowing the temperature of the liquid to be varied in accordance with the desired parameters of the battery.

In accordance with another aspect of the present invention, there is provided a method and system for using the apparatus defined above, which method includes the steps of dividing the liquid from the battery heat exchanger in the vehicle mounted storage battery into first and second portions, cooling the first portion of liquid at a preselected cooling rate, which in practice, is a fixed rate, then recombining the cooled first portion of liquid and the bypassed uncooled second portion of liquid to obtain the liquid to be directed to the heat exchanger and adjusting the ratio of the first and second portions in accordance with a preselected time-based profile or relationship. The advantages of this method were discussed with respect to the apparatus used in practicing this method.

In accordance with still another aspect of the present invention there is provided a method of charging an electric storage battery by an actuatable, electrical power supply located in or near a charging unit. In accordance with this method, the power supply is connected across the charging terminals of the battery mounted in the vehicle, the heat exchanger within the battery is connected into a fluid circuit including a portion in the charging unit, liquid is then pumped through the battery heat exchanger and through the circuit in the charging unit so that the method previously described can be employed wherein the liquid is divided into first and second portions, one of the portions is cooled at a fixed rate, and the liquid is then recombined to control the temperature within a specific area of the battery.

The primary object of the present invention is the provision of a method and apparatus for controlling the temperature of a cooling liquid supplied from an external source to the heat exchanger in a battery mounted on an electric powered motor vehicle.

Another object of the present invention is the provision of a method and apparatus, as defined above, which method and apparatus allows the cooling temperature of the liquid to be controlled in accordance with a desired or reference temperature that varies with time during a charging cycle of the storage battery.

Still a further object of the present invention is the provision of a method and apparatus, as defined above, which method and apparatus accurately tracks the temperature of the coolant liquid so that the optimum charging characteristics of the battery may be maintained during the charging cycle.

Yet another object of the present invention is the provision of a method and apparatus, as defined above, which method and apparatus also control the starting of the electric power to the battery and the discontinuation of this power after the charging cycle has been completed.

Another object of the present invention is the provision of a method and apparatus, as defined above, which method and apparatus controls the coolant inlet to the battery heat exchanger by dividing the exhaust liquid from the heat exchanger into two branches one of which is cooled and the other of which is bypassed so that the ratio of the cooled liquid to the bypass liquid can be adjusted to control the coolant temperature without changing the flow rate or the refrigeration rate.

These and other objects and advantages will become apparent from the following description taken together with the accompanying drawings.

BRIEF DESCRIPTION OF DRAWINGS

In the specification, the following drawings are employed:

FIG. 3 is a schematic view of a zinc-chloride battery of the type shown in FIG. 2 illustrating operating characteristics of the battery during the charging cycle and the relationship of these characteristics to the present invention;

FIG. 4 is a pictorial view illustrating a fixed charging unit employed in the preferred embodiment of the present invention;

FIG. 4A is a combined block diagram and wiring diagram showing schematically the power actuating system employed in the charging unit illustrated in FIG. 4;

FIG. 13 is a pictorial view of the preferred proportioning valve used in accordance with the preferred embodiment of the present invention;

FIG. 14 is an enlarged cross-sectional view taken generally along line 14—14 of FIG. 13;

PREFERRED EMBODIMENT OF THE INVENTION

Figure 1:
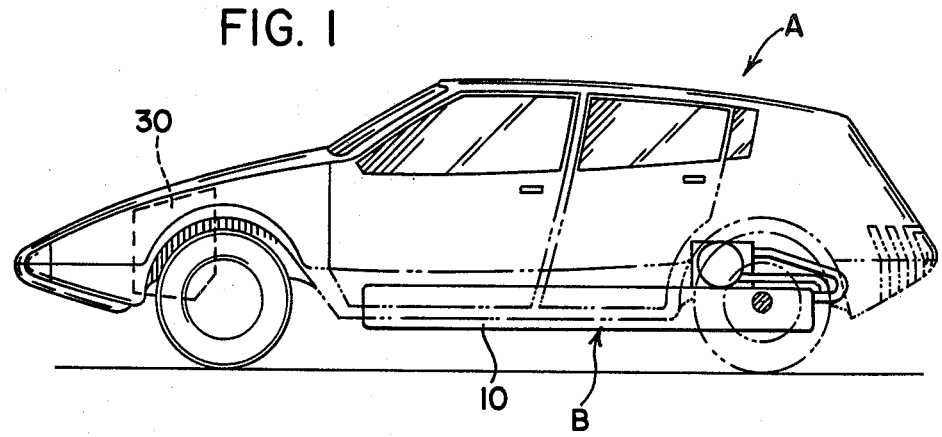
FIG. 1 is a schematic side-elevational view of a motor vehicle utilizing a zinc-chloride battery of the type to which the present invention is particularly useful.
Figure 2:
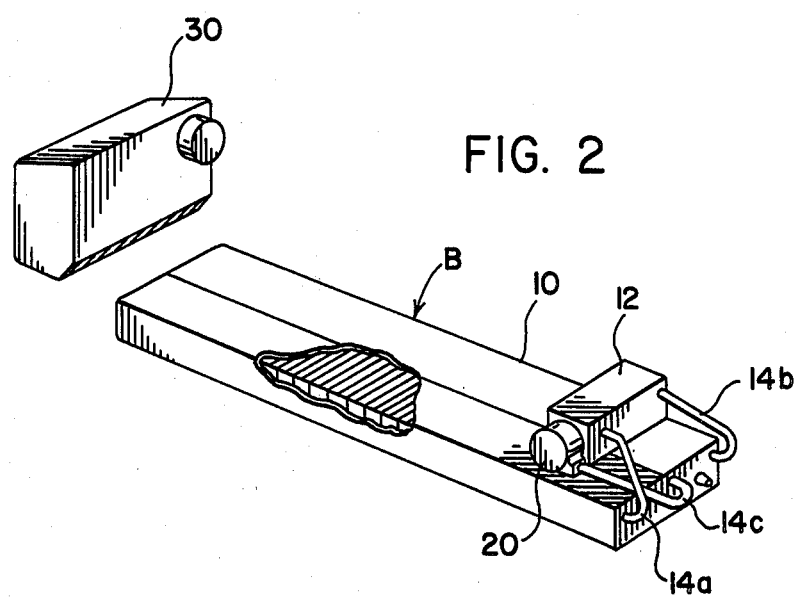
FIG. 2 is a schematic, pictorial view showing the zinc-chloride battery, the spaced storage unit and the electrolyte reservoir.

Referring now to the drawings wherein the showings are for the purpose of illustrating a preferred embodiment only and not for the purpose of limiting same, FIGS. 1–3 show an electric powered motor vehicle A driven by storage battery B of the zinc-chloride type, generally shown in U.S. Pat. No. 3,935,024, incorporated by reference herein. This type of battery is manufactured by/or for Energy Development Associates and has a substantially greater driving range between charges than other batteries being suggested for use in electric powered motor vehicles. This zinc-chloride battery is now being considered as a power source for electric powered motor vehicles such as vehicle A. A zinc-chloride battery or similar battery includes a stack portion 10 containing the electric cells and a reservoir or sump 12 for storage of electrolyte. Piping 14, including return lines 14a, 14b and pressure line 14c, is employed for circulating electrolyte by a 12 volts D.C. circulation pump. Storage tank 30 for chlorine-hydrate is connected by appropriate gas lines, not shown, and includes an internal pump 32 for pumping gaseous material, i.e. chlorine, from stack 10 during the charging cycle of battery B. As so far described, battery B of vehicle A is a standard zinc-chloride battery having, in the preferred embodiment, two groups of thirty cells, each of which produces approximately 2.0 volts D.C. Thus, the output across leads a, b, in practice is approximately 120 volts D.C. Of course, various other voltages could be obtained by different numbers of battery cells in stack 10. This type of storage battery is charged in accordance with the arrangement schematically illustrated in FIG. 3 wherein a zinc-chloride battery is selectively connected to fixed charging unit C, shown in FIG. 4, which charging unit is external of vehicle A and is connected to the vehicle by electrical lines 60, 62, terminating in a plug 64. Unit C produces 120 volts D.C. during a charging cycle. This voltage is applied to battery B by lines 60, 62 when plug 64, carried by the vehicle, is manually inserted into receptacle 66. At that time, an information or communication line 70 containing digital data or instructions for unit C is directed from the vehicle to the charging unit. This information indicates the condition of the main battery B within vehicle A and controls the charging unit C. For instance, unit C can be shut down when a fully charged condition has been established on battery B. Unit C, which houses the preferred embodiment of the present invention, can be located in a garage or parking lot and is powered by an appropriate 220 volts A.C. input line 72. Two glycol coolant lines 80, 82 direct coolant, processed in accordance with the preferred embodiment of the present invention, from unit C to battery B on vehicle A. These coolant lines circulate the coolant from unit C through the heat exchanger 100 of battery B, as shown in FIG. 3.

When unit C is connected to battery B and is operated in the charging mode, both pumps 20, 32 are operating. This circulates electrolyte thrugh stack 10 and pumps chlorine, by gas pump 32, into the storage tank 30. Chlorine-hydrate is formed in tank 30 due to the chilling action of bypassed electrolyte which is cooled by cooling circulating through battery heat exchanger 100 mounted adjacent intake line 84. Solenoid 86 is actuated to bleed a small amount of electrolyte through line 84 for chlorine-hydrate formation adjacent pump 32. The amount of electrolyte circulated through line 84 is controlled by a valve controlled by solenoid 86. To facilitate the heat transfer relationship between the electrolyte flowing in line 84 and the coolant flowing in the heat exchanger 100, line 84 is illustrated in FIG. 3 as having a heat exchanging coil portion 90.

When vehicle A has been brought to a location having a battery charging unit C, plug 64 from the vehicle is connected to electrical receptacle 66 on unit C. At the same time, quick disconnect coupling lines 80, 82 are used to couple the battery heat exchanger 100 with unit C. This heat exchanger is located in a specific area of battery B to control the temperature of electrolyte passing through heat exchanger portion 90 of line 84. This cooled electrolyte,the flow of which is controlled by solenoid valve 86, combines with the liberated chlorine in line 102, drawn by gas pump 32 from stack 10, to form chlorine-hydrate within storage tank 30. As 120 volts D.C. is applied to the charging terminals a, b, zinc is deposited on one set of battery electrodes and chlorine gas is liberated from the other set. Forming this gas into chlorine-hydrate in storage tank 30, reduces the pressure above the electrolyte in stack 10. This causes a reduced partial pressure of chlorine. Consequently, additional chlorine is forced out of solution. This liberated chlorine gas is also pumped through line 102 and converted into chlorine hydrate, as previously described. The zinc-chloride in the storage tank increases. Zinc chloride in the stack decreases during the charging operation. If the liberated chlorine gas within stack 10 is not rapidly converted to chlorine-hydrate, the pressure within stack 10 increases. This inhibits the charging operation; therefore, as the pressure increases in stack 10, additional coolant is needed to increase the formation of chlorine-hydrate. The solidification process removes chlorine gas from the stack and reduces its pressure.

Figure 9:
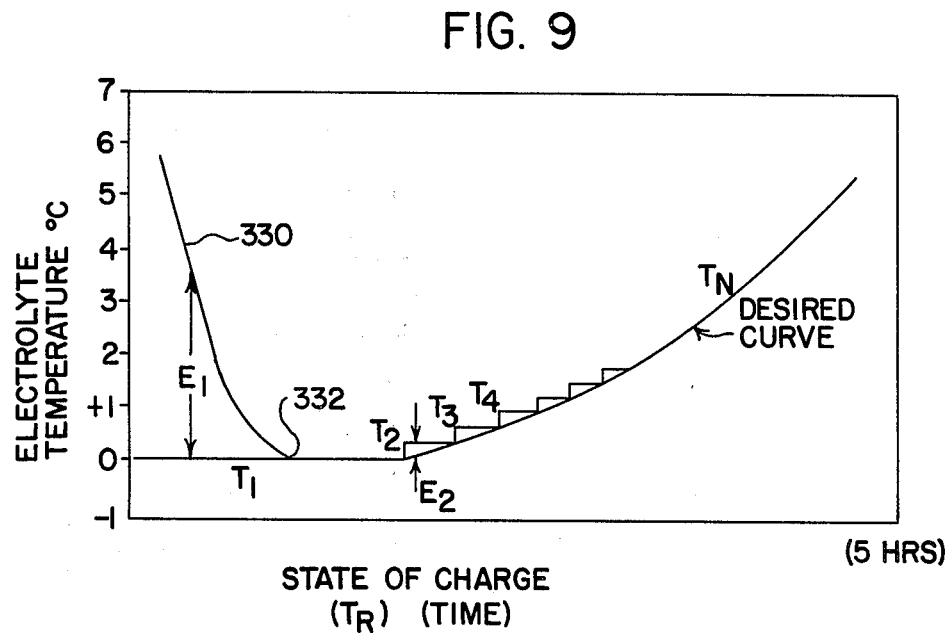
FIG. 9 is a graph illustrating the time-based relationship of a typical zinc-chloride battery during an approximately five hour charging cycle.

As can be seen, a limiting factor in the charging operation is the increased pressure of chlorine within stack 10. This can be controlled by temperature in the area of storage tank 30 cooled by heat exchanger 100. By controlling the temperature in this area, the pressure within the battery is controlled and charging continues at an optimum rate. The general temperature profile or curve for the temperature of the electrolyte combining with chlorine gas at pump 32, is schematically illustrated in FIG. 9. At the first portion of a charging cycle, the desired temperature $T_1$ remains relatively constant. As the charging cycle continues, the temperature increases, i.e. $T_2-T_N$. In practice, this temperature increases from approximately 0° C. to 5° or 6° C. over a five hour charging cycle for a zinc chloride battery of the type so far described. The present invention relates to the control of temperature of the electrolyte used in forming hydrate at pump 32 to optimize the charging cycle and control the pressure within the battery B. In practice, lines 84 and 102 are combined before they enter the inlet of pump 32; however, this particular configuration is not specifically illustrated in FIG. 3.

In FIG. 4A, an internal aspect of charging unit C is illustrated. Rectifier 110 is turned ON and turned OFF by binary logic applied to a start charge decoder 112 by data bus 114. When the data bus, within unit C, provides specific address logic, decoder 112 is actuated to energize rectifier 110. This directs 120 volts D.C. across lines 60, 62 by converting A.C. voltage from power lines 72. Information or data bus 114 can be supplied through data lines 70 or by a microprocessor circuit situated in charger unit C. These arrangements utilize either a microprocessor on vehicle A and communicated with unit C by data line 70 or a microprocessor system in unit C. These details of the programmed system for controlling the binary logic on bus 114 do not form a part of the invention. The system are illustrated schematically to show that charger or charging unit C is capable of energizing or deenergizing the power supply 110 for directing a charging current across charging terminals a, b of battery B.

Figure 5:
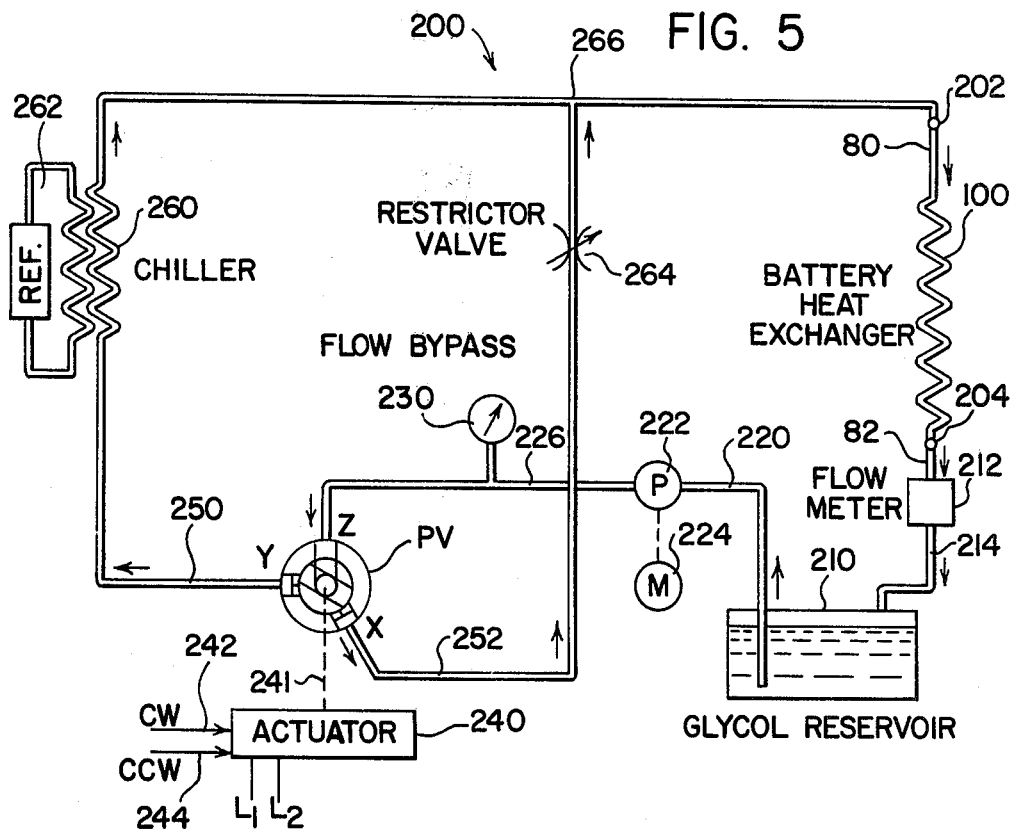
FIG. 5 is a piping diagram of the system employed in the preferred embodiment of the present invention.

Referring now more particularly to FIG. 5, liquid circuit 200 is used to direct coolant, in the form of glycol, through heat exchanger 100 by connecting lines 80, 82 shown in FIG. 3 and corresponding lines 80, 82 shown in FIG. 4. Appropriate quick disconnect fittings or couplings, schematically represented as fittings 202, 204 in FIG. 5, are used for the connection. Thus, charging unit C is coupled with vehicle A and more particularly with battery B by plug 64 and lines 80, 82. In circuit 200, a supply or sump 210 collects glycol from line 214 after it passes line 82 and flow meter 212. Thus, glycol in supply or sump 210 is received from heat exchanger 100 after it has been used to reduce the temperature of the electrolyte flowing in heat exchanger portion 90 of line 84. Line 220 connects sump or supply 210 with liquid pump 222 driven by an appropriate electric motor 224 which is located within charging unit C. Motor 224 can be an A.C. motor having a fixed velocity to drive pump 222 at a fixed rate. Pressure line 226 connects the outlet side of pump 222 with input Z of the proportional valve PV. Meter 230 is connected to pressure line 226 and is used to exhibit a pressure reading either continuously or selectively at the panel of unit C.

As so far described, exhausted, heated glycol from heat exchanger 100 is forced by pump 222 through line 226 to the inlet portion or line Z of proportional valve PV. This valve is a rotary spool valve and has a position controlled by actuator 240 connected to the spool of valve PV by an appropriate shaft 241. Actuator 240 rotates in a clockwise direction whena logic 1 appears in line 242. In a like manner, valve PV is driven by actuator 240 through shaft 241 in the counterclockwise direction when a logic 1 is applied to control line 244. Thus, actuator 240 rotates the spool of valve PV in accordance with the binary logic in lines 242, 244. In practice, actuator 240 is an A.C. motor actuator manufactured by Merle-Korff Industries of DesPlaines, Ill. and is provided with an internal gear reducer to produce a 5:1 motion ratio at shaft 241. Motor or actuator 240 is driven by 110 volts across lines L1, L2. The output of this motor or actuator, which is controlled by the logic on lines 242, 244, is connected to shaft 241. The gear reducer unit between the motor and shaft 241 is manufactured by Boston Gear. (Series No. 309) This arrangement of an A.C. motor and gear reducer drives shaft 241 at a rotary speed of 90° in 15 seconds. In view of this relatively slow speed, the motor has little tendency to overrun the desired amount of angular displacement. Thus, valve PV accurately follows a desired temperature profile or curve to obtain control over the liquid temperature of electrolyte in line 84. Valve PV also includes two outlet lines 250 (Y) and 252 (X). Outlet 250 is directed to heat exchanger or chiller unit 260 which is in heat exchange relationship with a refrigeration unit or device 262 located in charging unit C. Refrigeration unit 262 is schematically illustrated as including heat exchange tube in heat transfer relationship with the tube of chiller 260 so that the liquid passing from outlet 250 through chiller 260 is cooled to a fixed degree by refrigeration device 262. In practice, this device is turned at its highest setting. This setting does not vary during a charging cycle of battery B. In this manner, there is no need to modulate the refrigeration unit 262 to control the temperature of liquid flowing through heat exchanger 100. An adjustable flow restrictor valve 264 is adjusted to control the flow of bypass, substantially uncooled glycol from outlet 252 (X). A piping Tee 266, which recombines the cooled and uncooled or bypassed portions of glycol, directs the recombined liquid through line 80 for passage through heat exchanger 100. By using piping circuit 200, a coolant, such as glycol, is supplied at line 80 in accordance with the setting of flow proportioning valve PV.

Figure 6:
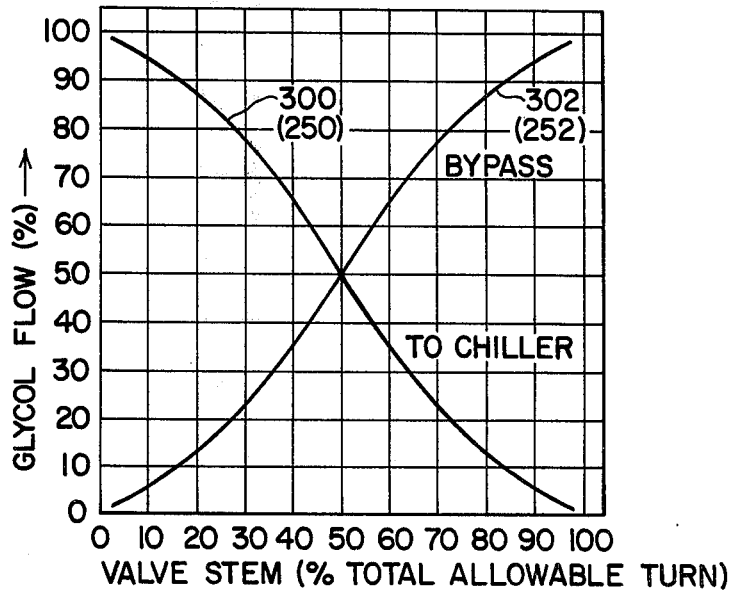
FIG. 6 is a graph showing the operating characteristics of the proportioning valve employed in the preferred embodiment of the present invention, as schematically illustrated in FIG. 5 and shown in FIGS. 13–18.

In FIG. 6, the curves 300, 302 represent the percentage of glycol flowing through the cooled line 250 (Y) and the bypass or uncooled line 252 (X). By employing the proportioning valve PV shown in FIGS. 13-18 in the circuit of FIG. 4, the curve illustrated in FIG. 6 can be obtained. To calibrate circuit 200, valve PV is placed in the zero position shown in FIG. 6. At that position, the pressure in line 226 and the flow rate in meter 212 is noted. The spool of valve PV is then rotated 60°, which is 100% displacement in the preferred embodiment. At that time the pressure and flow rate is again monitored. By adjusting restrictor valve 264, it is possible to substantially equate flow rate through heat exchanger 100 and the pressure in line 226 at both extremes of valve PV. After this has been done, the curves in FIG. 6 were obtained.

Figure 7:
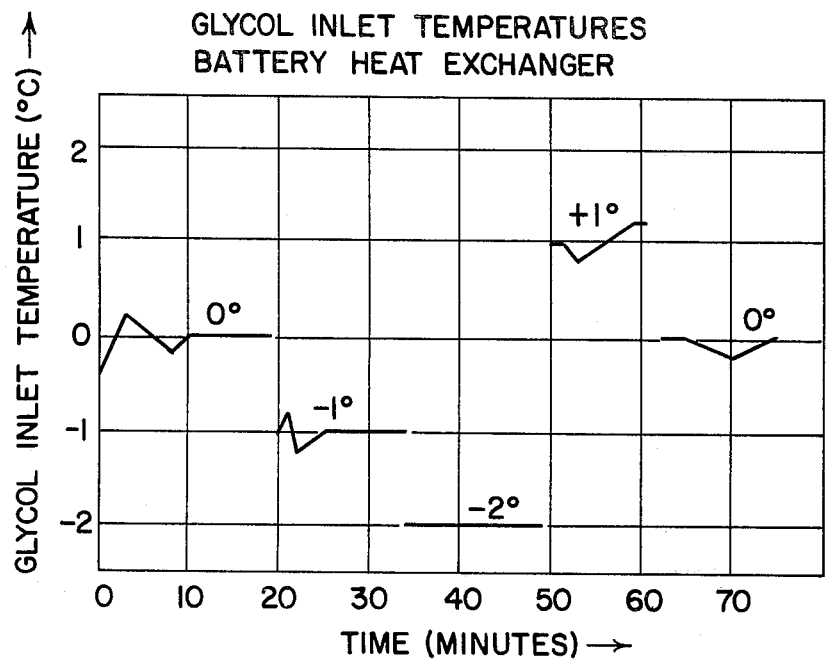
FIG. 7 is a disjointed graph showing temperature control at various manually selected temperatures by adjusting the proportioning valve schematically illustrated in FIG. 5 and shown in more detail in FIGS. 13–18.

A manual test was performed with the valve PV, as shown in FIGS. 13–18 and circuit 200 shown in FIG. 5. For the first fifteen minutes, valve PV was adjusted to an angular position where the glycol in line 80 was 0° C. As can be seen from FIG. 7, after this adjustment was made, the temperature remains substantially constant. Thereafter, the valve was shifted in an attempt to obtain a −1° C. reading at inlet 80. As can be seen, a relatively constant relationship could be established and retained over a prolonged period by a single angular setting of valve PV. After approximately thirty minutes, adjustment was made to −2° C. This temperature was held constant for several minutes without changing valve PV. An adjustment then was made to +1° C. and back to 0° C. This stability of the temperature of the coolant entering heat exchanger 100 was controlled by a valve constructed in accordance with the teaching of FIGS. 13–18 and the system schematically illustrated in FIG. 5.

As previously mentioned, a microprocessor or other programmable digital control device could be mounted on charging unit C or a single microprocessor in vehicle A could be employed for controlling the vehicle and charging unit C. In the schematically illustrated system shown in FIG. 8, it is contemplated that microprocessor 310 be mounted on unit C. Digital data from vehicle A is received on data line 70. To explain the present imnvention, the data received is constantly monitored temperature at the outlet of line 84 adjacent pump 32. An appropriate thermometer or other sensor 320 determines the temperature of the electrolyte being used to form chlorine-hydrate in storage tank 30 at pump 32. This information is digitized repeatedly so that binary data can be directed from output 321 to data line 70 where it is transmitted to unit C. This digital data is decoded at temperature decoder 322. When addressed, decoder 322 directs a plurality of bits to bus 114 which bits form one or more bytes to indicate the actual or current temperature of the electrolyte. Of course, the temperature could be monitored at other locations within any area controlled by heat exchanger 100. The most accurate indication to control battery pressure is the temperature of the electrolyte itself at pump 32. This temperature directly controls formation of chlorine-hydrate and thus, the pressure and chlorine liberation within battery B during the charging cycle. A standard PROM 312 and RAM 314 are used with the microprocessor for controlling the Executive Program or intermediate processing, respectively, as is standard practice in programmed systems utilizing a microprocessor. A memory MAP 316, which may be a ROM, is loaded with a tim-based relationship of actual temperature to desired temperature during progression of a charging cycle. This MAP is indexed during a charging cycle in accordance with real time so that a reference temperature $T_R$ is available from the MAP during any given time in a battery charging cycle. This MA follows a zinc-chloride optimized charging cycle as illustrated in FIG. 9 wherein reference frequency $T_R$ is progressed from $T_1$ to $T_N$ during a five hour charging cycle. As a result of the comparison between the data provided from decoder 322 and the data from memory MAP 316, digital information is periodically outputted by microprocessor 310 onto data bus 114. Consequently, a comparison between the actual temperature and the reference temperature is obtained. In accordance with the preferred control arrangement of the present invention, when the actual temperature reaches a given level, rectifier 110 is actuated through the decoder 112, as shown in FIG. 4A. This starts the charging of battery B. Periodic comparison of data on bus 114 controls actuator decoder or gate 324 to produce a logic 0 or logic 1 in lines 242,244. This logic controls actuator 240. A logic 1 on line 242 causes actuator 240 to rotate in a clockwise direction from a position allowing 100% flow through the cooling branch of FIG. 5 to a position allowing 0% flow through this branch. A logic 1 in line 244 has the opposite effect. In accordance with the system illustrated in FIG. 8, proportioning valve PV, shown in FIG. 5 and in more detail in FIGS. 13–18, is controlled in accordance with the desired temperature profile as shown schematically in FIG. 9.

The time-base relationship for charging a zinc-chloride battery is shown in FIG. 9. The reference temperature $T_R$ varies from $T_1$ to $T_N$ in steps. The profile set by these steps progresses from approximately 0° C. to approximately 6° C. over approximately five hours. The actual measured temperature at decoder 322 is schematically represented at the start of the charging cycle by curve 330. Curve 330 is substantially greater than the desired reference temperature $T_1$; therefore, a substantial error $E_1$ exists. Actuator 240 shifts valve PV to the full cool position with all coolant or glycol going through chiller or heat exchanger 260. This causes rapid cool down of the electrolyte used in forming chlorine-hydrate adjacent pump 32. Until the actual measured temperature represented by curve 330, reaches approximately reference temperature $T_1$, as schematically represented by point 332 in FIG. 9, rectifier 110 is not actuated. When error $E_1$ is reduced to the desired value, i.e. about $T_1$, rectifier 110 is energized to start current flow through lines 60, 62. The battery B is charged. Thereafter, proportioning valve PV is modulated in accordance with the error noted by a comparison between the actual temperature and the reference temperature. This action attempts to hold the actual temperature at the reference temperature. After a preselected time, a particular reference temperature is indexed upwardly. This is shown as $T_2$. This index or step immediately creates a new comparison error $E_2$. Valve PV is adjusted so that the error is eliminated. This can be done rapidly or may be done gradually as shown schematically in FIG.9. At some later time, a new reference temperature $T_3$ is outputted by memory MAP 316. Valve PV attempts to reach this temperature at pump 32. This action is continued. The temperature measured by sensor or thermometer 320 follows generally a desired curve 334 as shown in FIG. 9.

Figure 8:
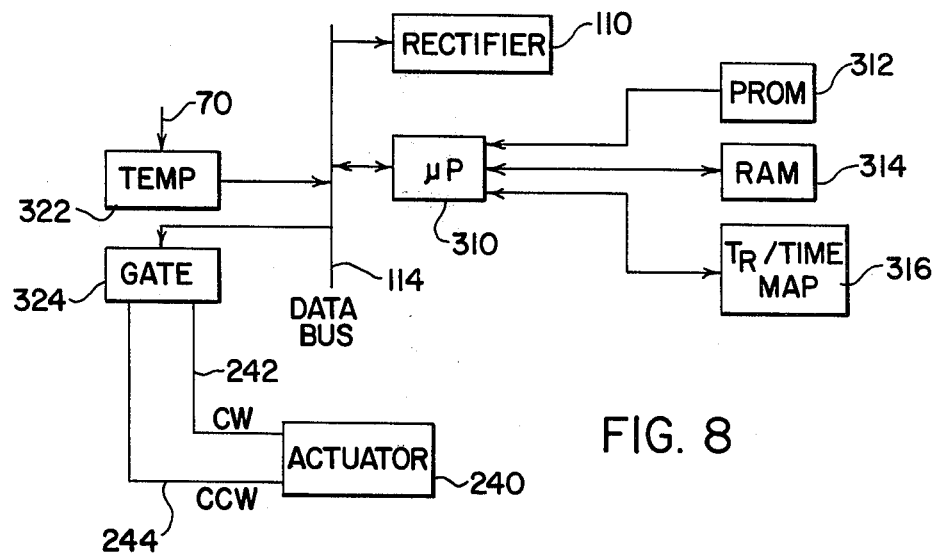
FIG. 8 is a block diagram showing the relationship between a microprocessor for controlling the system shown in FIGS. 4A and 5.
Figure 10:
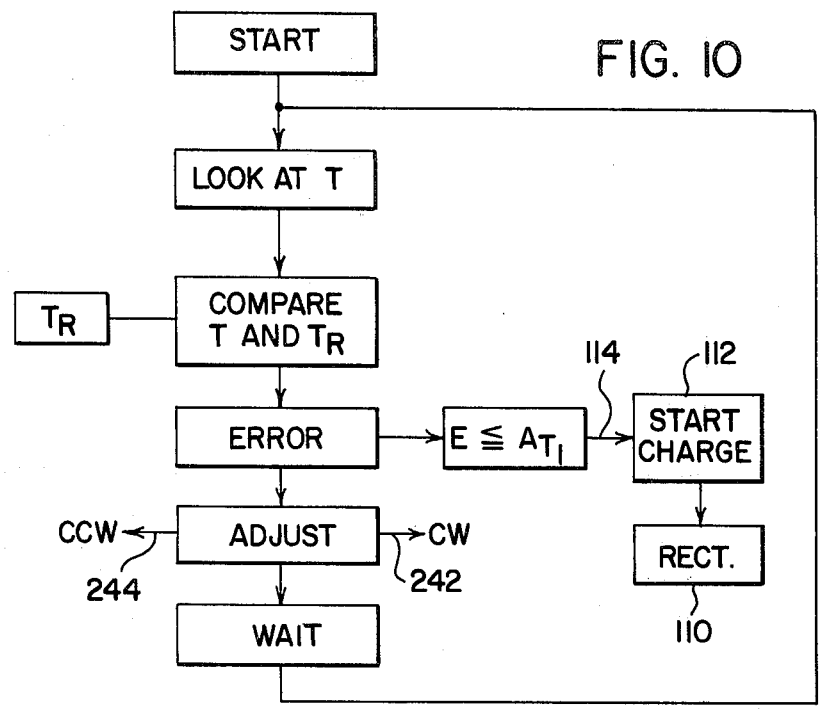
FIG. 10 is a flow chart for use in controlling the system as set forth in FIGS. 4A, 5 and 8 and used in the preferred embodiment of the present invention.
Figure 11:
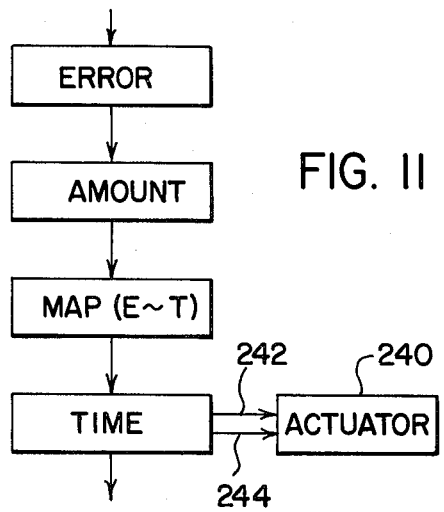
FIG. 11 is a partial flow diagram illustrating a modification of the preferred embodiment of the invention, as shown in FIG. 10.
Figure 12:
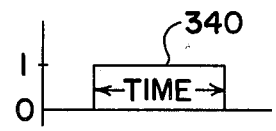
FIG. 12 is a simplified pulse diagram showing a pulse as created by the flow diagram of FIG. 11 for controlling the proportioning valve as shown in FIGS. 5 and 13.

Referring now to FIG. 10, a flow chart of the system described in connection with FIGS. 8 and 9 is illustrated. When the charging cycle is started, the Executive Program in PROM 312 indicates that data from decoder 322 is to be inputted. This data is then transmitted to RAM 314. Thereafter, microprocessor 310 addresses MAP 316 and places the binary representation of the reference temperature in a standard binary register associated with microprocessor 310. Thereafter, the register is compared with the temporarily stored data in RAM. The comparison of the two temperatures produces a difference which is indicated as an error. If this error is equal to or less than a function of $T_1$, i.e. $T_1$, decoder or gate 112 is addressed and actuated by the data bus 114 to actuate rectifier 110. This starts the current flow for charging battery B. After the error has been determined, an adjustment is made in the position of valve PV by outputting a logic 1 in either line 242 or line 244. A time delay or WAIT step is then performed and the cycle is repeated. This time delay can be varied and may be in the neighborhood of 0.10 minutes. The temperature control is over five hours and has a substantial amount of thermal inertia; therefore, rapid manipulation of valve PV is not required. In this embodiment, it is contemplated that a binary pulse of a given length of time be outputted in line 242 or line 244. If it is desired to change the length of the binary pulse or signal in accordance with the magnitude of the error, the preferred system as illustrated in FIG. 11 can be employed. In this system, the amount of error is detected and memory MAP 316 includes a chart indicating the length of time of a pulse for each of various error magnitudes. The logic 1 in lines 242, 244 is held for a preselected time controlled by the magnitude of the error as selected from MAP 316. This concept is illustrated in FIG. 12 wherein pulse 340 has a variable time length determined by the magnitude of the error found during the comparison between the actual and reference temperatures. If this control pulse had a fixed time, valve PV would be intermittently urged toward a desired position and could require a substantial number of pulses as illustrated in FIG. 10. In this instance, a rapid update would be advisable by reducing the length of the WAIT step. The WAIT time may be reduced substantially to give a more uniform tracking of the actual temperature to the reference temperature. If a variable pulse is created, as shown in FIG. 12, then the WAIT time can be increased to a general magnitude of 1.0 minute.

Referring now to FIGS. 13–17, the proportional valve PV used in the preferred embodiment of the invention is shown. This valve includes spaced end plates 400, 402 with cylindrical bosses 404, 406, respectively, which extend into housing 410 to form a liquid tight unit bolted together with a plurality of bolts 412. An internal cylindrical valve chamber 414 receives bosses 404, 406 to align chamber 414 with respect to the actuator shaft 241 which extends through opening 408 of end plate 400. An appropriate O-ring seal 409 seals rotatable shaft 241.

Within chamber 414 there is a rotary spool 420 having axially spaced journal ends 422, 424 and an intermediate cylindrical body 426. Combined thrust and radial ball bearings 430, 432 are used to suspend spool 420 within chamber 414 between bosses 404, 406 and journals 422, 424, respectively. The lower portion of spool 420 includes annular recess 440 and an axially extending center bore 442 closed at one end by a plug 443. Transversely extending bore 444 interconnects annular recess 440 with axially extending bore 442 which, in turn, intersects a transversely extending outlet port 450 above recess 440 and at the same general level as valve outlets 250, 252. inlet 452 is communicated with the inlet pipe 226 as illustrated in FIG. 5, to direct warm coolant or glycol to valve PV.

Figure 17:
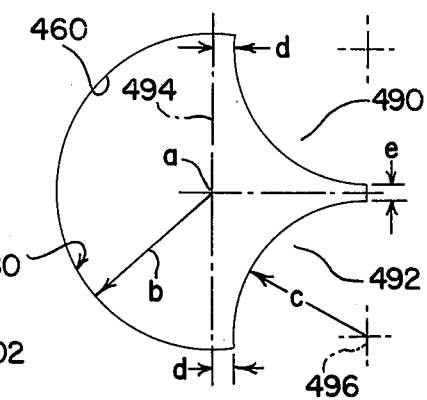
FIG. 17 is an enlarged, partial cross-sectional view taken generally along line 17—17 of FIG. 15; and, FIG. 18 illustrates several valving positions taken at several distinct ratio arrangements of the ports viewed generally along line 18—18 of FIG. 15.

Outlet bores 460, 462 each hold plug 480, 482, one of which is shown in detail in FIG. 17. These plugs are also shown schematically in FIG. 18. Each plug has a central, contoured opening. A variety of contours could be used to provide relatively small area changes for a given movement at the low flow rates and a relatively high change at the high flow rates. In the present invention, the aperture or metering orifice contour shown in FIG. 17 is employed in one of the plugs, in this instance plug 480. The plug orifice includes a central axis a and a radius b which defines an outer cylindrical surface which is concentric with but smaller than one of the outlet bores 460, 462. The plug is mounted in a bore and the orifice is cut by an Elox process. The disposition of the orifice in plug 480 is the orientation shown in FIG. 17 wherein arcuate protrusions 490, 492 are vertically aligned with each other and with respect to the vertical diameter 492 of the orifice or metering opening. Protrusions 490, 492 each have a radius c and an appropriate center on vertical line 496 parallel to line 494 and generally extending through the surface of plug 480. Radii c and the centers on lines 496 are dimensioned to provide a chordal dimension e generally equal to or slightly less than chordal dimensions d. These chordal dimensions are generally in the neighborhood of 5°-15°. Of course, modifications of this general profile could be employed without departing from the intended spirit and scope of the present invention. Preferred dimensions are set forth in FIG. 17.

Figure 15:
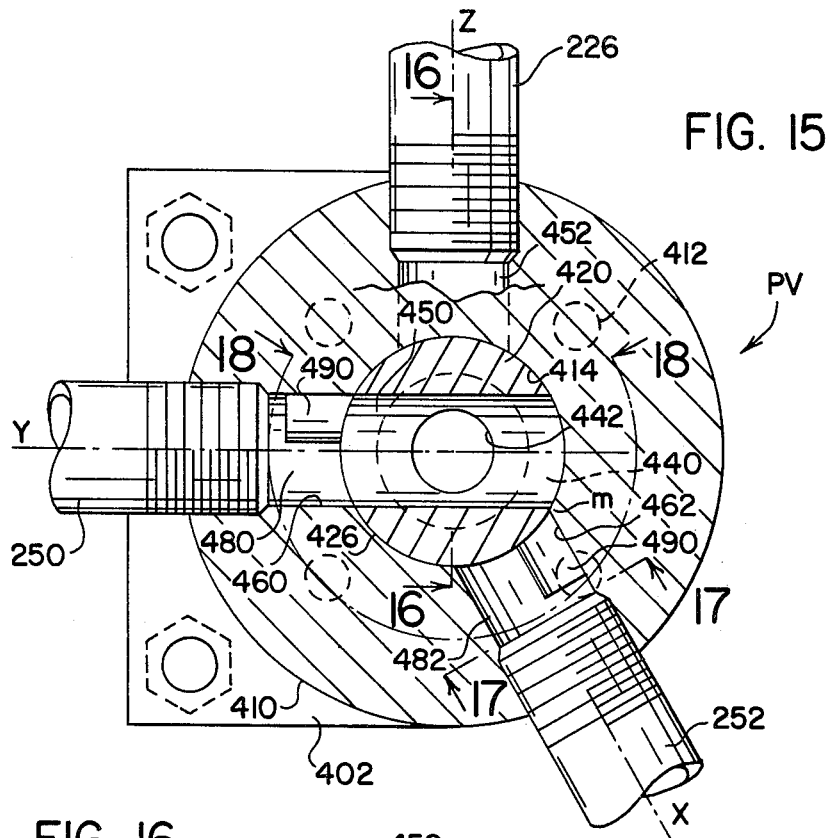
FIG. 15 is a top view, somewhat in cross-section, of the proportioning valve shown in FIG. 13.
Figure 16:
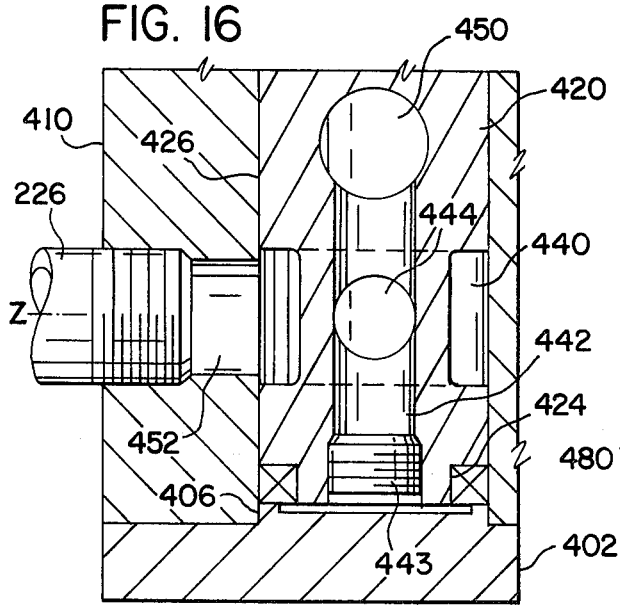
FIG. 16 is a cross-sectional view taken generally along line 16—16 of FIG. 15.

Referring now to FIG. 15, inlet bore 450 extends diametrically through body 426 of rotary spool 420, which is rotated by actuator 420 as previously described. Outlet (Y) which includes plugs 480 in bore 460 is angularly disposed and vertically aligned with bore 462 and its contoured opening 482. In FIG. 14, bore 450 is aligned vertically with bores 460, 462 and has the same dimensions. To set the angular disposition between outlets 250 (Y) and 252 (X) one relationship is illustrated in FIG. 15 and more distinctly in FIG. 18. This relationship is that when bore 450 is fully registered with one of the bores 460, 462, the other of these bores is closed. As spool 420 is rotated, it immediately commences the action of opening the closed port and closing the open port. This is shown in FIG. 15 wherein point m is generally an intersection between the cylindrical surface of bore 450 and the cylindrical surface of bore 462 when bore 460 is fully opened.

Figure 18:
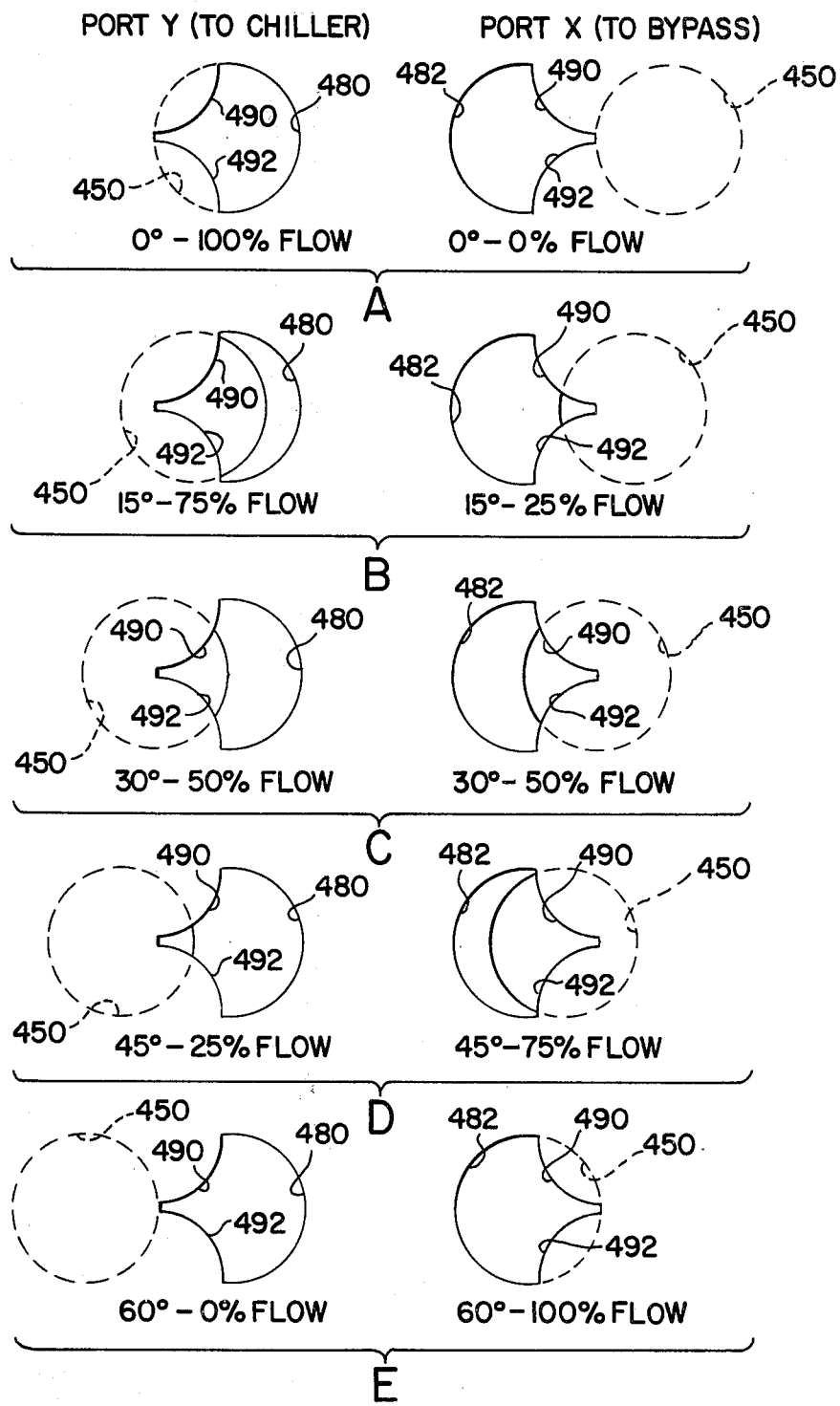

Referring now to FIG. 18, sections A-E illustrate the relative closing and opening of contoured ports or metering openings 480, 482 as spool 420 is moved in accordance with the flow relationship shown in FIG. 6. As is apparent, the restricted portions of the metering orifices in plugs 480, 482 face in opposite angular directions compared to the path of movement of spool 420.

Having thus defined the invention, the following is claimed:

1. A method of charging an electric storage battery by an actuatable, electrical supply located in or near a charging unit, said battery having a heat responsive characteristic to be controlled in accordance with a time-based temperature relationship at a given area of said battery by circulating a liquid through said battery and at said area and controlling the temperature of said liquid in accordance with said time-based relationship, said battery being mounted on an electric powered motor vehicle for driving said vehicle and having charging terminals, said method comprising the steps of:
   (a) connecting said power supply across said charging terminals of said battery;
   (b) providing a battery heat exchanger in said battery at said given area, said heat exchanger having an inlet portion for receiving a liquid, an outlet portion for discharging said liquid and an intermediate heat exchanger element for cooling said given area of said battery;
   (c) connecting said inlet and outlet portions into a fluid circuit in said charging unit;
   (d) pumping liquid through said battery heat exchanger at a known flow rate whereby said discharged liquid is at a temperature higher than the temperature of said liquid flowing into said battery heat exchanger;
   (e) dividing said discharged liquid into a first and second portion;
   (f) cooling said first portion in said charging unit;
   (g) combining said cooled first portion and second portion into said liquid flowing into said battery heat exchanger; and,
   (h) adjusting the ratio of the combining flow rates of said first and second portions in accordance with said time-based relationship.

2. The method as defined in claim 1 including the further step of adjusting the flow of said second portion.

3. The method as defined in claim 1 including the further step of maintaining the said cooling of said first portion constant.

4. The method as defined in claim 1 including the additional step of actuating said power supply in accordance with a position on said time-based relationship.

5. The method as defined in claim 4 including the additional steps of measuring the temperature in said given area and actuating said power supply when said measured temperature reaches a preselected value.

6. The method as defined in claim 3 including the additional steps of measuring the temperature in said given area and actuating said power supply when said measured temperature reaches a preselected value.

7. The method as defined in claim 2 including the additional steps of measuring the temperature in said given area and actuating said power supply when said measured temperature reaches a preselected value.

8. The method as defined in claim 1 including the additional steps of measuring the temperature in said given area and actuating said power supply when said measured temperature reaches a preselected value.

9. The method as defined in claim 8 including the further step of providing a proportioning valve and controlling said dividing step with said proportioning valve.

10. The method as defined in claim 6 including the further step of providing a proportioning valve and controlling said dividing step with said proportioning valve.

11. The method as defined in claim 1 including the further step of providing a proportioning valve and controlling said dividing step with said proportioning valve.

12. The method as defined in claim 11 including the additional step of:
   (i) measuring the actual temperature in said given area of said battery;
   (j) determining the desired temperature in said given area of said barttery at a give time;

(k) comparing said actual and desired temperatures; and,
(l) controlling said adjusting step in accordance with said comparison.

13. The method as defined in claim 6 including the additional steps of:
(i) measuring the actual temperature in said given area in said battery;
(j) determining the desired temperature in said given area of said battery at a given time;
(k) comparing said actual and desired temperatures; and,
(l) controlling said adjusting step in accordance with said comparison.

14. The method as defined in claim 1 including the additional steps of:
(i) measuring the actual temperature in said given area in said battery;
(j) determining the desired temperature in said given area of said battery at a given time;
(k) comparing said actual and desired temperatures; and,
(l) controlling said adjusting step in accordance with said comparison.

15. The method as defined in claim 14 including the additional step of:
(m) actuating said power supply in accordance with said comparing step.

16. The method as defined in claim 15 wherein said actuating step is performed when said measured temperature is approximately s preselected temperature as determined by said comparison step.

17. The method as defined in claim 16 including the additional step of making said comparison repeatedly during the battery charging time in said time-based relationship.

18. The method as defined in claim 17 wherein one of said comparison steps in said repeated comparsion steps is spaced on a time base by a wait interval of a known time.

19. The method as defined in claim 12 including the additional step of making said comparison repeatedly during the battery charging time in said time-based relationship.

20. The method as defined in claim 19 wherein one of said comparison steps in said repeated comparison steps is spaced on a time base by a waitt interval of a known time.

21. A method of providing a cooling liquid to the cooling heat exchanger at a given area of a storage battery mounted on a vehicle for driving said vehicle, said liquid being at an inlet temperature which varies in a time-based relationship and being obtained from said battery heat exchanger at a temperature greater than said inlet temperature, said method comprising the steps of:
(a) dividing said obtained liquid into first and second portions;
(b) cooling said first portion at a preselected cooling rate;
(c) recombining said cooled first portion and second portion of said obtained liquid to create said cooling liquid; and,
(d) adjusting the ratio of the recombining flow rates of said first and second portions in accordance with said time-based relationship.

22. The method as defined in claim 21 including the further step of adjusting the flow of said second portion.

23. The method as defined in claim 21 including the further step of maintaining the said cooling of said first portion constant.

24. The method as defined in claim 22 further including the step of:
(e) directing a charging current from a power supply to said battery in accordance with said time-based relationship.

25. The method as defined in claim 24 including the additinal steps of measuring the temperature in said given area and actuating said power supply when sad measured temperature reaches a preselected vlaue.

26. The method as defined in claim 21 including the further step of providing a proportioning valve and controlling said dividing step with said proportioning valve.

27. An apparatus for charging an electric storage battery by an actuatable, electrical power supply located in or near a charging unit, said battery having a heat responsive characteristic to be controlled in accordance with a time-based temperature relationship at a give area of said battery by circulating a liquid through said battery and at said area and controlling the temperature of said liquid in accordance with said time-based relationship, said battery being mounted on an electric powered motor vehicle for driving said vehicle and having charging terminals, said apparatus comprising the following:
(a) means for connecting said power supply across said charging terminals of said battery;
(b) means for providing a battery heat exchanger in said battery at said given area, said heat exchanger having an inlet portion for receiving a liquid, an outlet portion for discharging said liquid and an intermediate heat exchanging element for cooling said given area of said battery; (c) means for connecting said inlet and outlet portions into a fluid circuit in said charging unit;
(d) means for pumping liquid through said battery heat exchanger at a known flow rate whereby said discharged liquid from said heat exchanger is at a temperature higher than the temperature of said liquid flowing into said battery heat exchanger;
(e) means for dividing said discharged liquid into a first and second portion;
(f) means for cooling said first portion in said charging unit;
(g) means for combining said cooled first portion and second portion into said liquid flowing into said battery heat exchanger; and,
(h) means for adjusting the ratio of the combining flow rates of said first and second portions in accordance with said time-based relationship.

28. The apparatus as defined in claim 27 including means for adjusting the flow of said portion.

29. The apparatus as defined in claim 27 incluing means for maintaining the said cooling of said first portion constant.

30. An apparatus as defined in claim 27 including means for actuating said power supply in accordance with a position on said time-based relationship.

31. An apparatus as defined in claim 27 incluing means for measuring the temperature in said given area and means for actuating said power supply when said measured temperature reaches a preselected value.

32. An apparatus as defined in claim 27 including a proportioning valve as said diquid dividing means.

33. An apparatus as defined in claim 27 including:

(i) means for measuring tthe actual temperature in said given area of said battery;

(j) means for determining the desired temperature in said given area of said battery at a given time;

(k) means for comparing said actual and desired temperatures; and, (l) means for controlling said adjusting means in accordance with said comparison means.

34. An apparatus as defined in claim 33 further including;

(m) means for actuating said power supply in accordance with said comparison means.

35. An apparatus as defined in claim 34 wherein said means for actuating said power supply is actuated when said measured temperature is approximately a preselected temperature as determined by said comparison means.

36. An apparatus as defined in claim 35 including means for making said comparison repeatedly during the battery charging time in said time-based relationship.

37. An apparatus for providing a cooling liquid to the cooling heat exchanger at a given area of a storage battery mounted on a vehicle for driving said vehicle, said liquid being at an inlet temperature which varies in a time-based relationship and being obtained from said battery heat exchanger at a temperature greater than said inlet temperature, said apparatus comprising:

(a) means for dividing said obtained liquid into first and second portions;

(b) means for cooling said first portion at a preselected cooling rate;

(c) means for recombining said cooled first portion and second portion of said obtained liquid to create said cooling liquid; and, (d) means for adjusting the ratio of the recombining flow rates of said first and second portions in accordance with said time-based relationship.

38. An apparatus as defined in claim 37 further including:

(e) means for directing a charging current to said battery in accordance with said time-based relationship.

39. A method of charging an electric storage battery by an actuatable, electrical power supply located in a charging unit, said battery having a heat responsive characteristic to be controlled in accordance with a time-based temperature relationship at a given area of said battery by circulating a liquid through said battery and at said area and controlling the temperature of said liquid in accordance with said time-based relationship, said battery being mounted on an electric powered motor vehicle for driving said vehicle, said method comprising the steps of:

(a) circulating said liquid through said battery;

(b) measuring the temperature in said given area;

(c) maintaining said liquid at a selected temperature until said measured temperature reaches a preselected temperature; and, (d) then increasing said preselected temperature and said selected temperature until said battery is charged.

* * * * *